Figure 3:
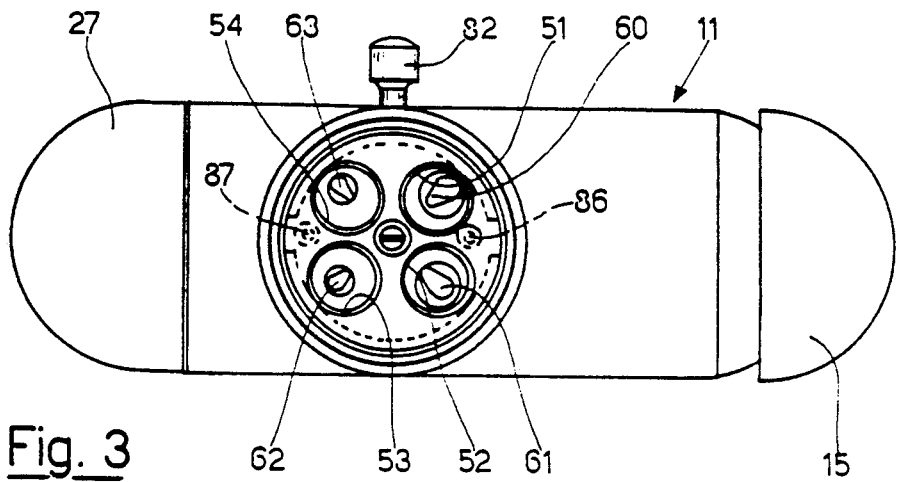

United States Patent [19]
Guzzini

[11] Patent Number: 5,293,901
[45] Date of Patent: Mar. 15, 1994

[54] DOUBLE-CONTROL TAP WITH SELECTOR

[75] Inventor: Mauro Guzzini, Recanati, Italy

[73] Assignee: Telma Guzzini s.r.l., Montelupone, Italy

[21] Appl. No.: 56,893

[22] Filed: May 5, 1993

[30] Foreign Application Priority Data

Jun. 2, 1992 [IT] Italy .................... MI92U000560

[51] Int. Cl.⁵ .................. F16K 11/16; F16K 11/20
[52] U.S. Cl. .................... 137/595; 137/607; 137/613
[58] Field of Search .......... 137/597, 606, 607, 594, 137/595, 613

[56] References Cited

U.S. PATENT DOCUMENTS

| | | |
|---|---|---|
| 4,653,538 | 3/1987 | Tsutsui et al. ............ 137/597 X |
| 4,794,952 | 1/1989 | Burkard ..................... 137/597 |
| 5,190,077 | 3/1993 | Pawelzik et al. ........... 137/597 X |
| 5,205,313 | 4/1993 | Moretti ..................... 137/606 X |

*Primary Examiner*—Stephen M. Hepperle
*Attorney, Agent, or Firm*—Jacobson, Price, Holman & Stern

[57] ABSTRACT

A water delivery device with at least one delivery mouth (45) comprises a body (11) containing first controlled means (13) for mixing and delivery from said mouth of water coming from two first sources and second controlled means (25) of delivery from said mouth (13) of water coming selectively from second sources. In the body of the device is arranged a selector element (49) operated alternatively between a position of connection of the two first sources to mixing inlets (17,18) of the first control means (13) and selective connection positions of one of the second sources to an inlet (29) of the second control means (25).

22 Claims, 4 Drawing Sheets

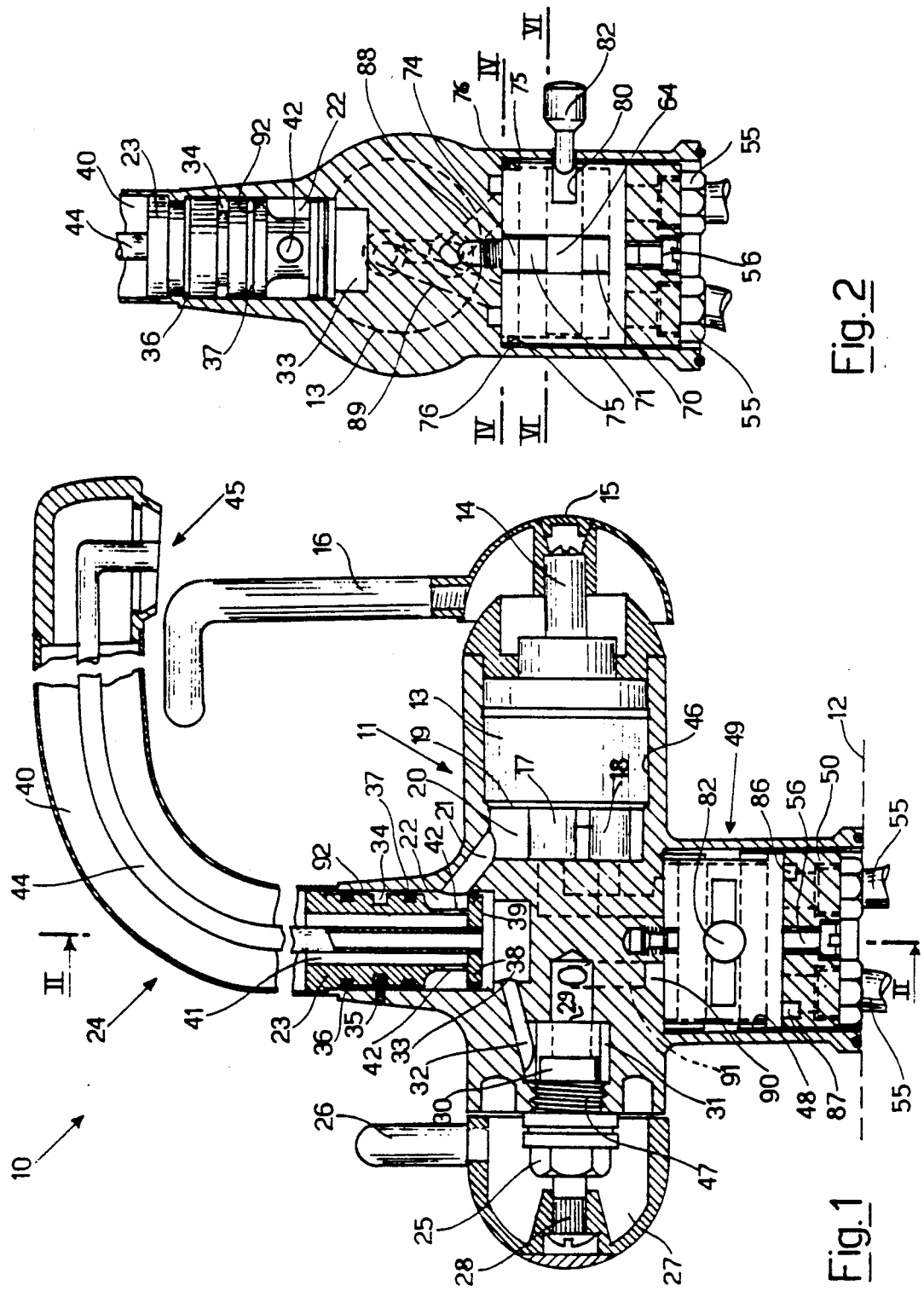

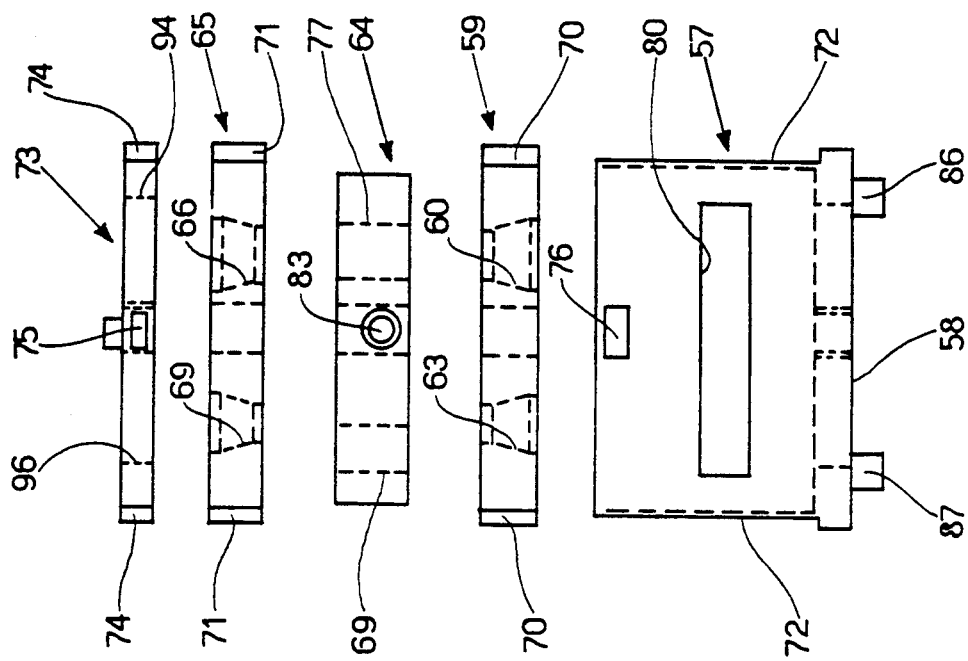
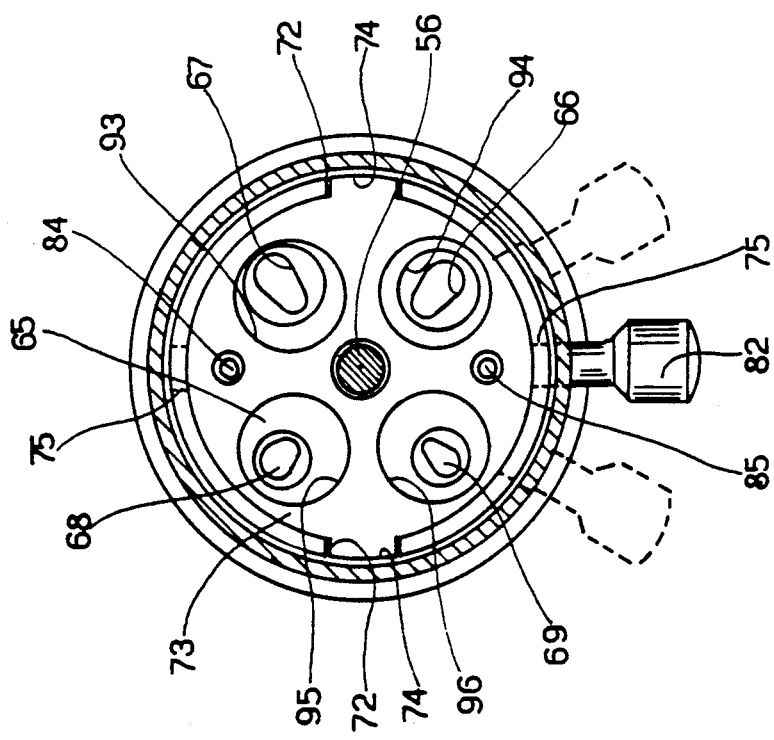
Fig. 5
Fig. 4

DOUBLE-CONTROL TAP WITH SELECTOR

The present invention relates to a double-control tap with source selector positionable on the edge of a sink or the like.

The general purpose of the present invention is to provide a single delivery device which would permit selection of the delivery from a plurality of treated water sources in addition to allowing normal mixed delivery of sanitary hot and cold water. Another purpose of the invention is to avoid any possibility of accidental pollution between treated water and sanitary water. The device in accordance with the present invention proposes also to provide said functions with limited space occupied and outer conformation of the device similar to that of normal mixing taps with two inlets so as to permit installation of the device in place of a normal mixing tap avoiding modifications to the sink or other complicated fitting operations.

In view of said purpose it has been sought to provide in accordance with the present invention a water delivery device with at least one delivery mouth comprising a body containing first controlled means for mixing and delivery from said mouth of water coming from two first sources and second means controlling delivery from said mouth of water coming selectively from second sources characterized in that it comprises therein a selector element operated alternatively between a position of connection of the two first sources to mixing inlets of the first control means and selective connection positions of one of the second sources to an inlet of the second control means.

Figures 6, 7:
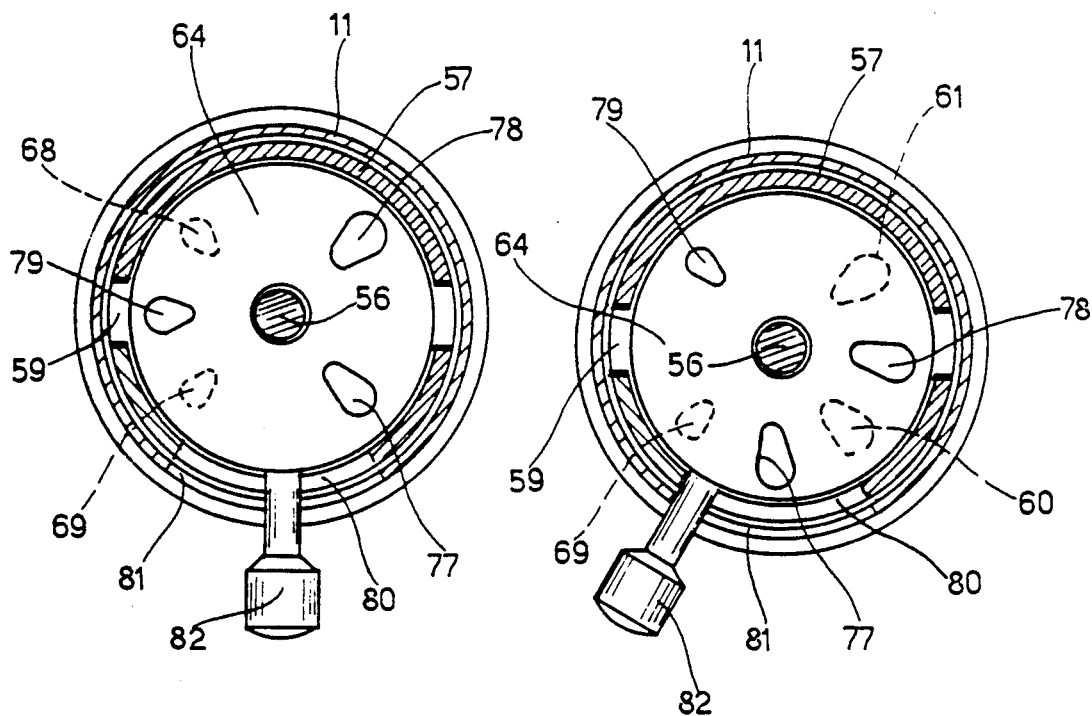
Figure 8:
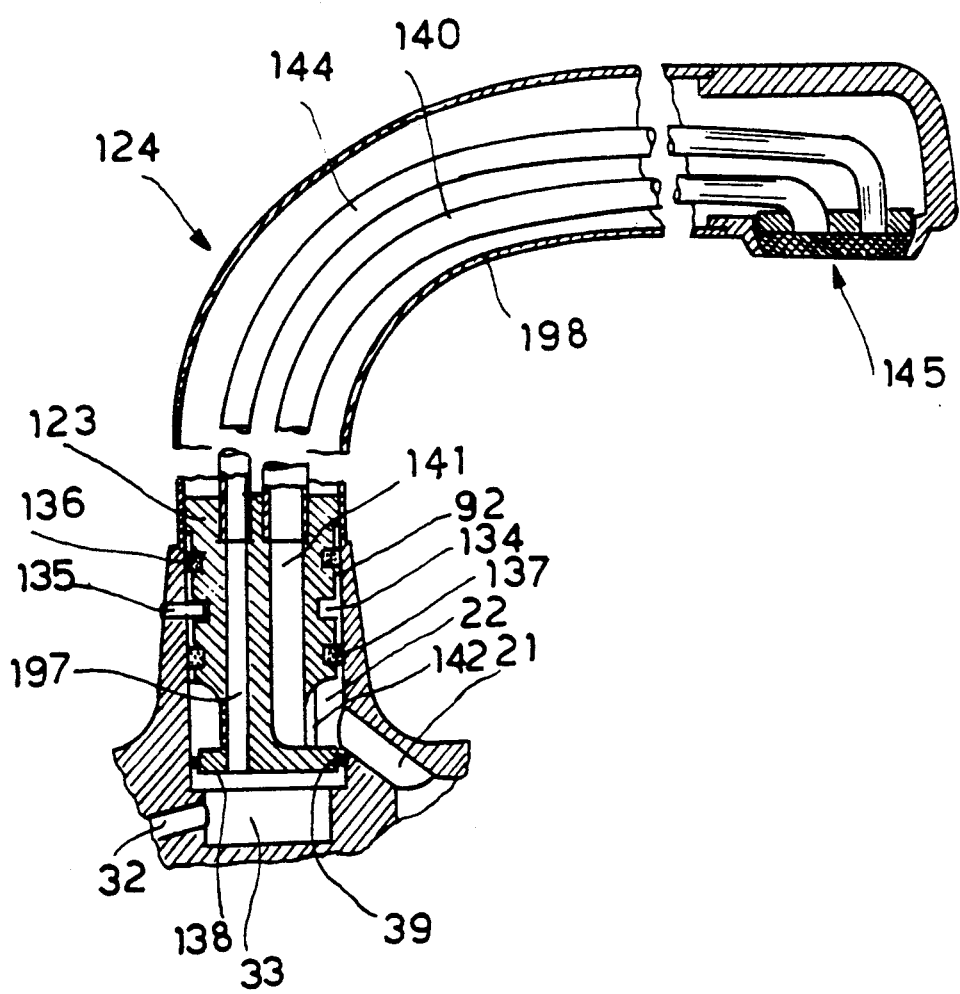

To clarify the explanation of the innovative principles of the present invention and its advantages compared with the known art there are described below with the aid of the annexed drawings possible embodiments by way of non limiting example applying said principles. In the drawings:

FIG. 1 shows a partially sectioned schematic side view of a tap provided in accordance with the present invention, FIG. 2 shows a partially sectioned view along plane of cut II—II of FIG. 1, FIG. 3 shows a bottom view of the tap of FIG. 1, FIG. 4 shows a sectioned view along plane of cut IV—IV of FIG. 2, FIG. 5 shows an exploded view of a detail of the tap of FIG. 1, FIG. 6 shows a sectioned view along plane of cut VI—VI of FIG. 2 of the tap in a first operating position, FIG. 7 shows a view similar to that of FIG. 6 but with the tap in a second operating position, and FIG. 8 shows a partially sectioned view of a possible variant of the tap of FIG. 1.

With reference to the figures FIG. 1 shows a tap provided in accordance with the present invention and indicated generally by reference number 10. Said tap comprises a body 11 which can be fastened below opposite a hole in a surface 12, e.g. the edge of a sink. The body 11 comprises a seat 46 for reception of a single-control mixing cartridge 13 of the known art, e.g. the ceramic disc type well known to those skilled in the art. The cartridge ha a control pin 14 connected through a cover element 15 to an operating lever 16.

The cartridge 13 has inlets 17 and 18 connectable as clarified below to hot and cold sanitary water sources. The cartridge 13 also has an outlet 19 debouching into a chamber 20 connected through a duct 21 to a first zone or chamber 22 of a seat 92 for rotating engagement of an end or engagement element 23 of a delivery tube element 24. In a position opposite that of the cartridge 13 the body 11 has a seat 47 for a known stem valve 25 commanded to rotate by a lever 26 projecting radially from a cover element 27 keyed onto the stem control pin 28. The stem valve 25 has an inlet 29 and an outlet 30 debouching into a chamber 31 connected through a duct 32 to a second zone or chamber 33 of the engagement seat of the tube element 24.

As seen also in FIG. 2 the cylindrical end 23 of the tube element has a peripheral groove 34 in which is inserted a screw or pin 35 to allow its rotation around the vertical axis preventing simultaneously its withdrawal from the seat. The end element 23 also has peripheral seats for O-rings 36, 37 for hydraulic seal toward the exterior and a discoid terminal zone 38 with hydraulic seal O-ring 39 separating the zones 22, 33. The tube element 24 comprises a first external tube 40 connected through a passage 41 of the engagement element 23 and through holes 42 to the first zone 22 identified by a radial restriction of the engagement element 23. A second tube 44 concentric with the first passes axially through the engagement element to debouch into the second zone 33. In this manner the external tube 40 leads to a delivery mouth 45 the water delivered by the mixer 13 while the tube 44 leads to the mouth 45 the water delivered by the stem 25. In the base or foot of the body 11 there is another seat 48 for reception of a selector element 49. The seat 48 is closed below by a closing element or plug 50 in which are present (as seen also in FIG. 3) passing engagement (e.g. screwed) seats 51, 52, 53, 54 for ducts 55 for connection of the tap to the water sources. The selector 49 and the plug 50 are held in position by a screw 56 which traverses them axially for screwing into the body 11 of the tap 10. As seen in FIG. 5 the selector 49 comprises a cup body or casing 57 with generally cylindrical side wall, a bottom 58 at a lower end and an opposite open upper end. The bottom comprises four openings positioned to coincide with the passing seats of the plug 50. In the selector body 57 is inserted a first or lower fixed disc 59 with four passages 60, 61, 62, 63 (FIG. 3) arranged to coincide with the corresponding passages in the bottom 58. A second disc or intermediate rotating selection disc 64 is stacked on the first and over it is stacked a third or top fixed disc 65 having four passages 66, 67, 68, 69 (FIG. 4) aligned with the corresponding four passages in the lower disc 59. The lower and upper discs are held in their position with passages aligned by tabs 70, 71 engaged in side grooves 72 on the peripheral wall of the body 57.

The intermediate disc rotates axially and freely. The casing 57 is closed at its upper end by a cover 73 having side tabs 74 for engagement in the groove 72 for its angular positioning and tabs 75 for snap engagement in seats 76 of the casing. Assembly of the selector elements is done by inserting in the casing the three stacked disks and placing over them the cover 73 in such a manner that it engages its snap tabs 75 in the seats 76 of the casing. In this condition the discs (advantageously of ceramic material) are pressed together so that the central disc rotates around its axis but the surface of the disks in mutual contact constitute a water seal.

As may be seen in FIGS. 3 and 4 respectively the passages in the lower and upper discs are arranged on two diameters of the discs substantially at right angles to each other. As may be seen in FIG. 6 the intermediate disc has only three passages arranged in such a manner that two of them 77 and 78 overlie the passages 60, 61 and 66, 67 of the two fixed discs while the third passage 79 is arranged in an intermediate position between the passages 62, 63 and 68, 69.

The casing 57 has a slit 80 extending peripherally to the height of the intermediate disc. When the selector 49 is inserted in its seat 48 the slit 80 faces a complementary slit 81 in the body of the tap 11 for the passage of a handling pin 82 with its end inserted in a seat 83 in the intermediate disc. In this manner the intermediate disc can rotate radially between two end positions by manual action on the pin 82 as may be seen in broken lines in FIG. 4.

The cover 73 has two pins 84, 85 (FIG. 4) projecting above to engage complementary seats in the housing 48 of the selector so as to ensure correct angular positioning. Analogous pins 86, 87 project from the base of the selector to engage complementary seats in the plug 50 so as to ensure alignment between the passages in the plug and those on the bottom of the selector.

When the selector is inserted in its seat and the plug is positioned to be blocked by the screw 56 the upper passages 93, 94 in the selector cover align with corresponding passages 88, 89 made in the body 11 to connect with the inlets 17,18 of the mixing cartridge 13. Upper passages 95, 96 of the cover 73 align with a chamber 90 which through a duct 91 connects them to the inlet 29 of the stem valve 25.

In use the tap 10 is connected by the unions 51, 52 to two sanitary water sources, hot and cold respectively, while the unions 53, 54 are connected one to a first treated water source, e.g. purified and gasified, and the other to a second treated water source, e.g. purified and cooled. As may be seen from an examination of the figures and the above description, when the selector pin 82 is in the central position of FIG. 6 the unions 51, 52 for inlet of sanitary water are connected through the selector 49 to the mixing cartridge 13 while the unions 53, 54 for inlet of treated water are isolated from the inlet of the stem valve, the selector disc placing itself between corresponding passages between the fixed discs. In this condition action on the lever 16 permits regulation of the flow and mixing of the sanitary waters which issue from the mouth 45 through the duct 40. Operating the lever 26 has no effect.

By operating the selector pin 82 to move it to one of its ends of travel in the groove 81 (e.g. as shown in FIG. 7 for the left end), the passages 77, 78 of the moving disc and the corresponding passages in the fixed discs misalign to interrupt passage of the sanitary water to the mixing cartridge while the passage 79 aligns with one of the two treated water passages to the stem 25. For example while FIG. 7 shows alignment with the passages of the water arriving from the union 53, specular operation would bring the passage 79 into alignment with the passages of the water arriving from the union 54. In this manner the sanitary water is interrupted and operation of the lever 16 has no effect while operation of the stem valve 25 regulates flow of the treated water selected by the position of the lever 82 and water issues from the mouth 45 through the duct 44.

As seen in FIGS. 3, 4 and 6, the passages in the fixed discs have advantageously an outlet mouth on the surface of the disc opposite the intermediate disc of circular form so as to mate with the passages toward the unions and toward the ducts in the body 11 while the mouth on the side facing the intermediate disc has elongated form with one part of greater width toward the periphery of the disc analogously to the form of the passages on the moving disc. Said elongated form was found advantageous for providing easy selection as is readily imaginable for those skilled in the art.

In addition, as the flowrate required of the treated water is generally less than that required of the sanitary water, the passages of the former have a surface area smaller than that of the latter just as the duct 44 has a smaller cross section than the duct 40.

It is now clear that the purposes of the invention have been met by providing a tap device allowing in a reduced space occupied both delivery of treated water and delivery and mixing of sanitary water while keeping completely separate the paths of the two types of water and making impossible involuntary mixing thereof. The whole has a structure characterised by easy construction, assembly and maintenance, and limited cost.

As concerns maintenance it is clear that cleaning and replacement of the selector are easy since it is sufficient to unscrew the screw 56 to remove it. Naturally the above description of an embodiment applying the innovative principles of the present invention is given merely by way of example and therefore is not to be taken as a limitation of the patent right claimed here. For example, the form of the device shown can be changed to suit it to specific aesthetic or construction requirements. In addition, although the two delivery tubes are shown concentric, it is readily imaginable to those skilled in the art how to obtain an embodiment with side-by-side tubes or a single tube divided by a longitudinal internal diaphragm. Naturally if complete separation of the paths for the water coming from the two sets of sources connected to the two tap controls is not required, even a single tube can be used.

For example, FIG. 8 shows a possible variant of the tube delivery part of the above described tap. Similar parts are indicated by the same reference numbers as in FIG. 1 with 100 added.

As seen in FIG. 8, in the chamber 22 of rotating engagement is inserted with 0-ring 136, 137, 139 for hydraulic seal an end or engagement element 123 of a delivery tube element 124 identifying a separation baffle 138.

Analogously to the embodiment of FIG. 1 axial rotation with blocking against withdrawal is provided by a screw or pin 135 insert in a peripheral groove 134 of the engagement element 123.

To the engagement element is fixed axially one end of a tubular jacket 198 which forms the exterior of the tube delivery element and terminates at the other end with a delivery mouth 145.

In the jacket 198 are placed two substantially parallel delivery tubes 140 and 144. The engagement element 123 has a first internal passage 141 terminating with a hole 142 for connection of the first tube 140 with the zone 22 in which debouches the passage 21 coming from the mixer. The engagement element also has a second internal passage 197 for connection of the second tube 144 with the zone 33 in which debouches the passage 32 coming from the stem. The interior tubes 140 and 144 are separated from the interior wall of the jacket 198 so as to be thermally insulated from the exterior. Although a mere layer of air Proved to be sufficient, the insulation can be increased if desired by placing between the tubes and the jacket a layer of low conductivity thermal material. There are thus avoided thermal losses in the path of the water from the tap to the delivery mouth and the danger of scalding by touching the tube element 124 when very hot water is running in it.

Even though for the sake of simplicity in the figures the control pin 82 is shown to be inserted directly in the intermediate disc, it is possible to imagine, especially for discs made of ceramic material, the use of a ring nut surrounding peripherally the disc and to which is fastened the pin. It is also imaginable to those skilled in the art how the connections between the selector element, unions and ducts in the body of the device can ensure hydraulic seal and require gaskets, e.g. O-rings, not shown for the sake of simplicity in the drawings.

Lastly it is easy to imagine how to provide a device with a larger number of treated water sources simply by increasing the number of passages in the selector and the union plug 50.

I claim:

1. A water delivery device with at least one delivery mouth (45) comprises a body (11) containing first controlled means (13) for mixing and delivery from said mouth of water coming from two first sources and second controlled means (25) of delivery from said mouth (45) of water coming selectively from second sources and characterized in that it comprises a selector element (49) operated alternatively between a position of connection of the two first sources to mixing inlets (17,18) of the first control means (13) and selective connection positions of one of the second sources to an inlet (29) of the second control means (25).

2. Device in accordance with claim 1 characterized in that the first means comprise a mixing cartridge (25) arranged in a seat (46) made in said body.

3. Device in accordance with claim 1 characterized in that the second means comprise a cut-off stem valve arranged in a seat (47) made in said body (11).

4. Device in accordance with claim 2 characterized in that the seats (46,47) are arranged facing each other on opposite sides of the body (11) there projecting therefrom control members (14,16,26,28) of the first and second means.

5. Device in accordance with claim 1 characterized in that the selector element (49) comprises an intermediate selection disc (64) arranged between a first sliding surface on one side of it and a second sliding surface on the other side of it and the selection disc (64) being manually rotatable around its own axis to selectively bring into alignment passages (77,78,79) arranged through it with passages (60,61,62,63) debouching on the first surface and connected to unions (51,52,53,54) for connection to the sources and passages (66,67,68,69) debouching on the second surface and connected to said first (13) or said second (25) controlled means.

6. Device in accordance with claim 4 characterized in that the first and second surfaces belong to corresponding fixed discs (59,65) arranged on two sides of the selection disc (64) and having passages debouching on the surfaces facing the selection disc traversing the discs to face on their opposite respective surfaces to connect with said unions (51,52,53,54) and with said first (13) and second (25) means respectively.

7. Device in accordance with claim 6 characterized in that the first discs (59) and second discs (65) and the intermediate disc (64) are inserted in a containment casing (57).

8. Device in accordance with claim 7 characterized in that the casing has a generally cylindrical form and comprises a bottom 58 at one end and a closing cover (73) at the other end.

9. Device in accordance with claim 8 characterized in that the cover (73) has means (75) for snapped fastening on the casing (57).

10. Device in accordance with claim 1 characterized in that the selection element (49) is received in a seat (48) provided in a lower foot of the body (11).

11. Device in accordance with claim 10 characterized in that the seat (48) for receiving the selector element is open below for introduction in and reception of a closing plug (50).

12. Device in accordance with claim 5 characterized in that the plug (50) comprises said unions (51,52,53,54) for connection to the sources.

13. Device in accordance with claim 5 characterized in that for its axial rotation the intermediate disc (64) is connected to a control pin substantially radial thereto and projecting from the body (11) through a sliding slot (81).

14. Device in accordance with claim 7 characterized in that the casing (57) comprises laterally grooves (72) for reception of tabs (70,71) projecting radially from the first (70) and second (71) discs to identify a stable angular position.

15. Device in accordance with claim 11 characterized in that axially to the selection element (49) and the closing plug (50) passes the stem of a screw (56) with head reacting against the closing plug and screwed in the opposite bottom of the reception seat (48) to block in place the plug (50) and the selector element (49).

16. Device in accordance with claim 5 characterized in that the passages (60,61,62,63) debouching on the first surface and the passages (66,67,68,69) debouching on the second surface are arranged spaced peripherally on the discs and have an elongated form in the radial sense with a part widened toward the exterior of the discs.

17. Device in accordance with claim 5 characterized in that the passages (77,78,79) through the moving disc (64) are arranged spaced peripherally on the discs and have a cross section with elongated form in the radial sense with a part widened toward the exterior of the discs.

18. Device in accordance with claim 13 characterized in that the passages (60,61,62,63) and the passages (66,67,68,69) debouching on the first and second surfaces are four and the passages (77,78,79) through the moving disc (64) are three in the position of connection of the two first sources to the first control means (13) corresponding to the position of the control pin (82) intermediate to the ends of the slit (81) and two of the three passages of the moving disc aligning with the corresponding two passages of the fixed discs connected to the first sources and to the first control means, the third passage (79) being arranged halfway between the two other passages of the fixed discs connected to the second sources and to the second control means (25).

19. Device in accordance with claim 1 characterized in that the first control means (13) have a mixed outlet (19) connected to said delivery mouth (45,145) through a first tube (40,140) and the second control means (25) have an outlet (30) connected to said delivery mouth (45,145) through a second tube (44,144).

20. Device in accordance with claim 19 characterized in that the first and second tubes are concentric.

21. Device in accordance with claim 19 characterized in that the first and second tubes are contained in an external thermal insulation jacket.

22. Device in accordance with claim 19 characterized in that for connection to the first tube (40,140) and second tube (44,144) the outlets of the first and second control means are connected in an axially offset position in a generally cylindrical engagement seat (92) in which is inserted in a rotatable manner an end element (23,123) of said tubes having a baffle (38,138) for separation of the engagement seat (92) in two chambers (22,33) each connected to one outlet of the control means and in which debouch the first tube (40,140) and second tube (44,144) respectively.

* * * * *